Patented Apr. 30, 1946

2,399,456

UNITED STATES PATENT OFFICE 2,399,456

PLASTICIZED POLYVINYL COMPOSITIONS

Edward S. Yates and Robert F. Gager, Niagara Falls, N. Y., assignors to E. I. du Pont de Nemours & Company, Wilmington, Del., a corporation of Delaware No Drawing. Application January 21, 1943, Serial No. 473,121

4 Claims. (Cl. 260—36)

This invention relates to the preparation of plasticized polymerized vinyl alcohol compositions of a type suitable for use in the preparation of articles by molding, extrusion or other fabrication methods. More particularly, it relates to the preparation of plasticized polyvinyl alcohol compositions, compositions in which the polyvinyl alcohol may have any saponification number up to about 500, by the incorporation of a formaldehyde polymer as a plasticizing agent in the polyvinyl alcohol composition, said polymer of formaldehyde being preferably incorporated therein under substantially anhydrous conditions.

Formaldehyde has previously been caused to react with polyvinyl alcohol in aqueous reaction media, or under equivalent conditions, for the purpose of making polyvinyl acetals. In all such cases, however, the formaldehyde did not exert any plasticizing effect, nor did it in any way render the polyvinyl alcohol more resilient or rubbery in character. Frequently the acetal resulting from the formaldehyde treatment became even harder and more brittle than the polyvinyl alcohol starting material.

Previously when polyvinyl alcohol was plasticized under anhydrous or substantially anhydrous conditions, it has been usual to employ a plasticizing agent such as glycerol, ethanol formamide, ethanol acetamide, triethylene glycol and other polyglycols, acetamide, sugar, thiocyanates, sulfamides, and glycerol esters. When the preparation of molded compositions was the aim, it was most usual to employ glycerol and glycerol esters as the plasticizing agents. Unfortunately the resulting molded compositions, prepared under substantially anhydrous conditions, are unduly water-sensitive, sweating and changing dimensions when exposed to the action of atmospheric moisture. Some of the compositions now known to the art even possess the serious disadvantage of dissolving in cold water.

We have now found that polyvinyl alcohol compositions of any degree of saponification can be most effectively plasticized by the incorporation therein, preferably under anhydrous or substantially anhydrous conditions, of a solid polymer of formaldehyde in amount sufficient to secure the desired degree of plasticity. Any solid polymer of formaldehyde (a polyoxymethylene glycol) may be utilized. We have secured very satisfactory results with paraformaldehyde, the polyoxymethylenes particularly "trioxymethylene" and with trioxane. The formaldehyde polymer may be utilized alone or in conjunction with other usual plasticizing agents such as the polyglycols, triethylene glycol, acetamide, ethanol acetamide, ethanol formamide, sugar, thiocyanates, sulfamides, glycerol and glycerol esters, etc.

Accordingly, it is one of the objects of this invention to prepare plasticized polymerized vinyl alcohol compositions, of any degree of saponification up to saponification number 500, by the incorporation therein preferably under substantially anhydrous conditions, of one or more solid polymers of formaldehyde as the plasticizing agent. Another object of this invention is the preparation of plasticized polyvinyl alcohol compositions especially of a type suitable for molding or extrusion, which compositions are much less water-sensitive than those plasticized compositions now available, by utilizing in their preparation one or more of the solid formaldehyde polymers as the plasticizing agent. These and other objects of this invention will be apparent from the ensuing disclosure of certain preferred embodiments thereof.

In the past when formaldehyde has been utilized to treat polyvinyl alcohol compositions it has been utilized under conditions wherein insolubilization or acetalization has been effected. This has generally required the application of the formaldehyde in aqueous media and always in the presence of an acidic catalyst. We have now found that the solid polymers of formaldehyde when incorporated in polyvinyl alcohol compositions, especially when incorporated under anhydrous conditions, exert not only an insolubilizing effect of greater or less degree, but also marked plasticizing action, the resulting products being resilient and rubber-like to an appreciable extent. It is thus evident that the solid polymers of formaldehyde function much differently from formaldehyde itself, and produce products of markedly different character. While paraform is perhaps our preferred solid polymer of formaldehyde by reason of its relative low cost, and while in the ensuing disclosure we refer to paraform as typical of this group of plasticizing agents, any other solid polymer of formaldehyde such as the polyoxymethylenes, trioxymethylene, trioxane, etc., may be utilized with equivalent results.

The paraform may be readily incorporated with the polyvinyl alcohol composition in an anhydrous or substantially anhydrous state, and the presence of a catalyst is never necessary. The addition of the plasticizer may be accomplished in various ways: thus, the formaldehyde polymer and polyvinyl alcohol may be mechanically admixed in the dry state to yield a powder capable of being molded, or the polyvinyl alcohol can be milled into sheet form and the paraform added during the milling operation. As an alternative mode or procedure, the paraform or other solid formaldehyde polymer may be added during the actual preparation of the polyvinyl alcohol itself, i. e. during the hydrolysis step.

The product is an extremely clear, flexible and rubber-like material having considerable resistance to the action of water. The presence of the paraform or other solid polymer of formaldehyde permits the incorporation of large amounts of water-soluble plasticizers such as ethanol formamide and ethanol acetamide which, up to now, have been regarded as insufficiently compatible with completely hydrolyzed polyvinyl alcohol to permit the manufacture of flexible rubbery products under anhydrous conditions. In addition to the formaldehyde polymer, other plasticizing agents suitable for use under anhydrous conditions may be employed, and we have secured particular success when using glycerol and glycerol esters in addition to the paraform or other solid polymer of formaldehyde as a mixed plasticizing agent. By the use of additional plasticizing agents with the formaldehyde polymer plasticizer it is possible to secure rubbery products having varying degrees of water resistivity and any desired degrees of hardness.

Polyvinyl alcohol plasticized by the addition of a solid formaldehyde polymer may be readily cast from solutions thereof yielding a clear plasticized film having a high degree of resilience. Films of this character cannot be secured by incorporating formaldehyde with polyvinyl alcohol and casting films from its solution, as the resulting sheets in this case are always sticky, to an undesirable extent.

The amount of paraform or other solid polymer of formaldehyde utilized may range up to 200% by weight based on the weight of the polyvinyl alcohol. When other plasticizers such as glycerol or polyglycols, or glycerol esters, are also present the amount of solid formaldehyde polymer may be somewhat less than when the paraform is utilized alone to secure an equivalent plasticizing effect.

Standard methods of fabrication for preparing commercial products from the plasticized polymerized vinyl alcohol may be employed without undue release of formaldehyde from the composition in the form of its vapor during the fabricating step. The usual fillers, dyes, and insolubilizing agents introduced into commercial compositions may be present without interfering in any way with the plasticizing action of the formaldehyde polymer.

When paraform is mixed with alcohols it is known that polyoxymethylene ethers are formed. Thus when paraform is introduced into methanol there results a chemical reaction introducing a certain number of methyl groups on the ends of the polyoxymethylene chain. It is our belief that some similar type of reaction occurs when the paraform or other solid formaldehyde polymer is mixed with the polymerized vinyl alcohol and the plasticized composition molded or extruded, and that this type of acetal or hemi-acetal formation is responsible for the remarkable improved properties of our compositions. However, we do not wish to be bound by any theory to which the plasticizing action and reduced water sensitivity is to be attributed, as the desirable result is secured regardless of mechanism.

When paraform is mixed with plasticizers containing hydroxyl groups such as glycerine, polyglycols and hydroxyamides it would be expected that hemi-acetal and/or ether linkages would be formed by a chemical reaction involving the hydroxyl groups of the plasticizing agent. Instead of decreasing compatibility, as might thus be expected as a result of the increase in molecular weight and change of hydroxyl groups to alkoxy groups, we have observed that the compatibility of the two plasticizers is actually increased to a truly surprising extent.

Among the advantages of modifying polyvinyl alcohol compositions with paraform and other solid polymers of formaldehyde, in place of or in conjunction with other usual plasticizing agents, is the fact that the formaldehyde polymers have shown themselves to be far more compatible with completely hydrolyzed polyvinyl alcohol than any other plasticizing agent utilized to date, with the exception of water. Because of this increased compatibility it has been possible to mold soft rubber-like products out of completely saponified polyvinyl alcohol compositions, a result not previously securable with other common anhydrous plasticizing agents.

Moreover polyvinyl alcohol compositions modified with solid formaldehyde polymers have exhibited substantially no tendency to "sweat" in humid weather. The resulting compositions are in all cases relatively insensitive to the action of water and to organic solvents. By taking advantage of the inherent solvent resistance of polyvinyl alcohol, simultaneously modifying its properties by the addition of the formaldehyde polymer plasticizing agent to produce a remarkable decrease in water sensitivity, it is possible to produce moldable compositions which are practically unaffected by ordinary liquids or by atmospheric conditions. These compositions have excellent stability at room temperature and at all temperatures up to those approaching temperatures at which decomposition of the paraform or other formaldehyde polymer might occur. They may be utilized to form gaskets or other articles which are resilient and rubber-like in character, but which are not affected to any substantial degree by water or by organic solvents.

The following examples illustrate the improved properties of the polymerized vinyl alcohol compositions resulting when a solid polymer of formaldehyde is incorporated as plasticizing agent. In Examples 1 to 3 the plasticizing agent is glycerol, an agent now widely used for this purpose. The characteristics of the compositions of Example 1 to 3 are to be contrasted with those of Examples 4 to 6, wherein paraform alone is utilized as the plasticizing agent. In Examples 7 to 12 inclusive a mixed plasticizing agent comprising a solid polymer of formaldehyde and glycerol was utilized. The desirable characteristics of these compositions, resulting from the presence of the solid polymer of formaldehyde, are also to be contrasted with those resulting from the use of glycerol alone as illustrated by Examples 1 to 3.

*Example 1*

100 parts of completely hydrolyzed polyvinyl alcohol were mixed with 30 parts of glycerol in a mortar. The composition was molded for 10 minutes at 145 to 150° C. under 2500 lbs. hydraulic pressure. The resultant molding had the following properties:

(a) Shore hardness _____ 95
(b) Clarity _____ Opaque
(c) Water absorption _____ 145.1%
(d) Retention of plasticizer_____ Poor
(e) Cold crack temperature_____ 0 to −5° C.
(f) Tensile strength ____ Could not be measured
(g) Percent elongation __ Could not be measured

*Example 2*

100 parts of completely hydrolyzed polyvinyl alcohol were mixed with 50 parts of glycerol in a mortar. The composition was molded under same conditions as Example 1. The resultant molding had the following properties:

(a) Shore hardness _____ 85 to 88
(b) Clarity _____ Opaque
(c) Water absorption _____ 161.9%
(d) Retention of plasticizer _____ Very poor
(e) Cold crack temperature _____ −5° C.
(f) Moldings could not be evaluated for tensile strength and percent elongation.

*Example 3*

100 parts of partially hydrolyzed polyvinyl alcohol were mixed with 40 parts of glycerol. It was molded for 15 minutes at 150° C. under 2000 lbs. pressure.

(a) Shore hardness _____ 35
(b) Clarity _____ Transparent
(c) Water absorption _____ 260%
(d) Cold crack temperature _____ −5° C.
(e) Tensile strength _____ 1500 lbs./sq. in.
(f) Percent elongation _____ 250

*Example 4*

100 parts of completely hydrolyzed polyvinyl alcohol was mixed with 100 parts of paraform in a mortar. The composition was molded for 20 minutes at 150° C. under 3000 lbs. hydraulic pressure. The molding had the following properties:

(a) Shore hardness _____ 50
(b) Clarity _____ Transparent
(c) Water absorption _____ 98.0%
(d) Cold crack temperature _____ −15° C.
(e) Molding was not evaluated for tensile and percent elongation.

*Example 5*

100 parts of completely hydrolyzed polyvinyl alcohol was mixed with 50 parts of paraform in a mortar. The mixture was molded for 20 minutes at 150° C. under 300 lbs. hydraulic pressure.

(a) Shore hardness _____ 60
(b) Clarity _____ Transparent
(c) Water absorption _____ 85%
(d) Cold crack temperature _____ −10 to −15° C.
(e) Tensile strength _____ 1500 lbs.
(f) Percent elongation _____ 350

*Example 6*

100 parts of partially hydrolyzed (about 75%) polyvinyl alcohol was mixed with 50 parts of paraform in a mortar. It was molded for 20 minutes at 150° C. under 3000 lbs. hydraulic pressure.

(a) Shore hardness _____ 55
(b) Clarity _____ Transparent
(c) Water absorption _____ 105%
(d) Cold crack temperature _____ −10° C.
(e) Tensile strength _____ 2000 lbs.
(f) Percent elongation _____ 250

*Example 7*

30 parts of completely hydrolyzed polyvinyl alcohol were mixed with 20 parts of paraform and 60 parts of glycerol in a mortar. It was molded for 25 minutes at 145° C. under 5000 lbs.

(a) Shore hardness _____ 30
(b) Clarity _____ Transparent
(c) Water absorption _____ 260%
(d) Retention of plasticizer _____ Good
(e) Cold crack temperature _____ Below −40° C.
(f) Tensile strength _____ 400 lbs.
(g) Percent elongation _____ 400

*Example 8*

40 parts of completely hydrolyzed polyvinyl alcohol were mixed with 10 parts of paraform and 50 parts of glycerol in a mortar. It was molded under same conditions as Example 7.

(a) Shore hardness _____ 45
(b) Clarity _____ Transparent
(c) Water absorption _____ 171%
(d) Retention of plasticizer _____ Fair
(e) Cold crack temperature _____ Below −40° C.
(f) Tensile strength _____ 1200 lbs./sq. in.
(g) Percent elongation _____ 390

*Example 9*

50 parts of completely hydrolyzed polyvinyl alcohol were mixed with 25 parts of paraform and 25 parts of glycerol. It was molded under same conditions as Example 7.

(a) Shore hardness _____ 35
(b) Clarity _____ Transparent
(c) Water absorption _____ 125%
(d) Retention of plasticizer _____ Good
(e) Cold crack temperature _____ Below −40° C.
(f) Tensile strength _____ 2500 lbs./sq. in.
(g) Percent elongation _____ 230

*Example 10*

50 parts of completely hydrolyzed polyvinyl alcohol were mixed with 40 parts of paraform and 10 parts of glycerol in a mortar. It was molded under same conditions as Example 7.

(a) Shore hardness _____ 55
(b) Clarity _____ Transparent
(c) Water absorption _____ 119%
(d) Retention of plasticizer _____ Fair
(e) Cold crack temperature _____ −35° C.
(f) Tensile strength _____ 3400 lbs./sq. in.
(g) Percent elongation _____ 180

*Example 11*

60 parts of completely hydrolyzed polyvinyl alcohol were mixed with 12.5 parts of paraform and 27.5 parts of glycerol. It was molded under same conditions as Example 7.

(a) Shore hardness _____ 55
(b) Clarity _____ Transparent
(c) Water absorption _____ 130%
(d) Retention of plasticizer _____ Very good
(e) Cold crack temperature _____ −35° C.
(f) Tensile strength _____ 3100 lbs./sq. in.
(g) Percent elongation _____ 185

*Example 12*

50 parts of partially hydrolyzed polyvinyl alcohol (75% hydrolyzed) were mixed with 25 parts of paraform and 25 parts of glycerol. It was molded under same conditions as Example 7.

(a) Shore hardness _____ 40
(b) Clarity _____ Transparent
(c) Water absorption _____ 120%
(d) Retention of plasticizer _____ Good
(e) Cold crack temperature _____ −40° C.
(f) Tensile strength _____ 3700 lbs./sq. in.
(g) Percent elongation _____ 300

As it is apparent that many widely different embodiments of this invention may be made without departing from the spirit thereof, it is to be understood that we do not limit ourselves in the foregoing examples or description, given as merely illustrative of the invention, except as indicated in the following claims.

We claim:

1. The method of plasticizing polymerized vinyl alcohol which comprises admixing in the solid state, polymerized vinyl alcohol with plasticizing amounts of solid polyoxymethylene glycol.

2. The method of plasticizing polymerized vinyl alcohol which comprises admixing, in the solid state, polymerized vinyl alcohol with plasticizing amounts of paraformaldehyde.

3. Plasticized polyvinyl alcohol comprising polymerized vinyl alcohol containing, admixed therewith in the solid state, plasticizing amounts of a solid polyoxymethylene glycol.

4. Plasticized polyvinyl alcohol comprising polymerized vinyl alcohol containing, admixed therewith in the solid state, plasticizing amounts of paraformaldehyde.

EDWARD S. YATES.
ROBERT F. GAGER.